May 6, 1952 H. E. ALTGELT 2,595,503
CROP BALER WITH MEANS FOR GROOVING BALES FORMED THEREBY
Filed May 5, 1950 2 SHEETS—SHEET 1
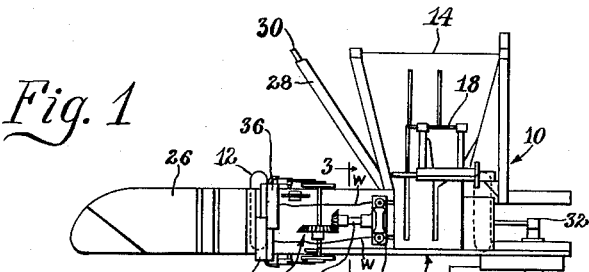
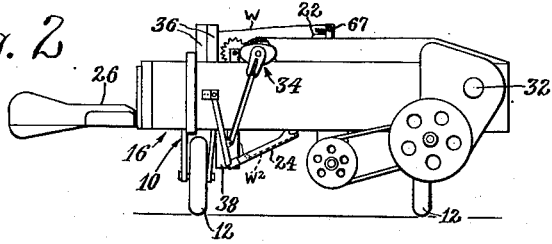
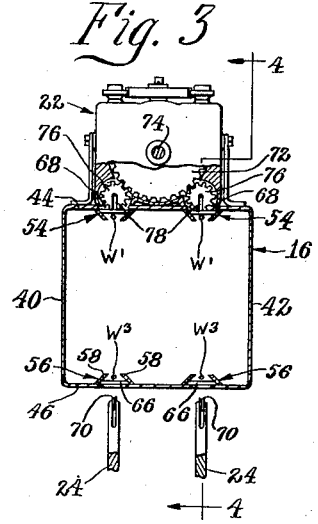
INVENTOR.
Herman E. Altgelt May 6, 1952 H. E. ALTGELT 2,595,503
CROP BALER WITH MEANS FOR GROOVING BALES FORMED THEREBY
Filed May 5, 1950 2 SHEETS—SHEET 2
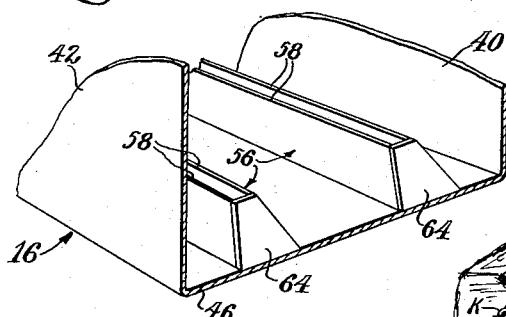
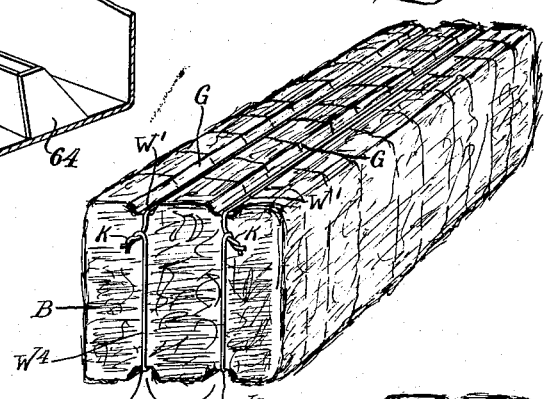
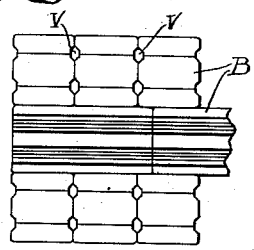
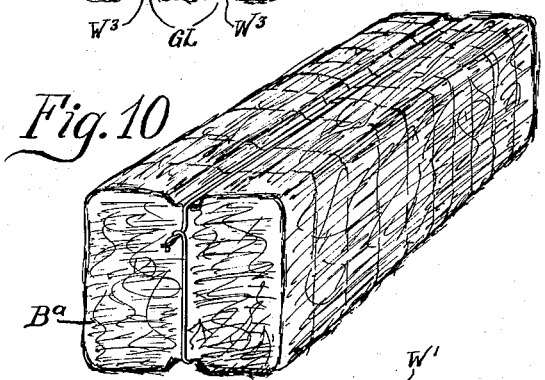
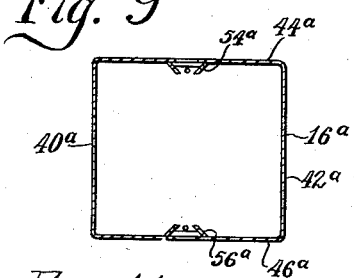
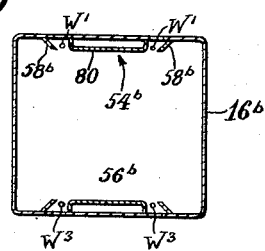
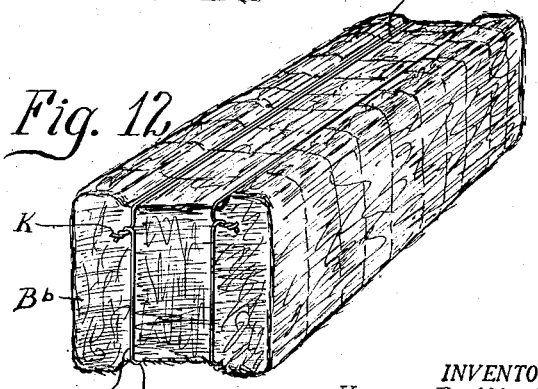
INVENTOR.
Herman E. Altgelt
BY
Attorneys Patented May 6, 1952

2,595,503

UNITED STATES PATENT OFFICE 2,595,503

CROP BALER WITH MEANS FOR GROOVING BALES FORMED THEREBY

Herman E. Altgelt, Moline, Ill., assignor to Deere & Company, Moline, Ill., a corporation of Illinois Application May 5, 1950, Serial No. 160,299

2 Claims. (Cl. 100—20)

This invention relates to a baler for baling agricultural crops such as hay, straw or the like. More particularly, the invention resides in means for forming external grooves in certain sides of the bales for the purpose of receiving the twine or wire used for tying the bales and for the further purpose of making provision for ventilation of the bales when stored.

The typical agricultural crop baler is of the pick-up type and is automatic in operation. As it advances over the field, its pick-up mechanism gathers severed crops from the ground and suitable feeding means feeds the crops into bale-forming means including a plurality of walls arranged to provide an elongated bale case that is rectangular in section and in which a plunger reciprocates to compact the crops into successive bales. The baler will further include tying mechanism that handles a tying medium such as twine or wire for tying successive bales at predetermined intervals ordinarily based on the attainment by each bale of a predetermined size.

As the bales are formed they are successively ejected or discharged through one end of the bale case, falling upon the group to be picked up subsequently by either a bale loader or by manual labor. It is customary to tie each bale by a pair of parallel strands of wire or twine running lengthwise and across the ends of the bale.

When the bales are handled manually, the strands of wire or twine provide convenient means by which the bales may be picked up. However, the handling of bales in this fashion has many disadvantages, foremost of which is the loosening of the wire or twine by repeated handling, which ultimately results in disintegation of the bale. Another disadvantage is that the bale handlers are apt to have their hands injured by the wire or twine or even by the crop material itself, some of which is relatively stiff and has quite sharp ends.

According to the present invention, a conventional baler is improved to the extent that it is provided with means for forming one or more grooves lengthwise of the bale. In its adaptation to a conventional baler in which a pair of parallel strands are utilized to tie the bale, the invention will provide at each of a pair of opposed bale case walls a pair of groove-forming elements, each preferably in the form of a channel fixed to and projecting into the bale case from such bale case wall. Each channel runs lengthwise of the bale case, or in the direction of plunger reciprocation. In one embodiment of the invention, the channels of each pair are relatively long and narrow and are spaced apart on the order of the spacing of the customary or conventional spacing of the wire or twine. Each channel opens inwardly and is adapted to receive or accommodate the twine or wire, which lies lengthwise of the bale case during the formation of the bale. When the bale is completed, the wire or twine may be wrapped around the bale in the usual fashion. The channels function to provide grooves running lengthwise of the bale, and these channels accommodate or receive the binding wire or twine. One advantage of a bale formed by such means is that the grooves retain the wire and prevent the wire from slipping off the bales. Another advantage is that the recessed wire or twine discourages handling of the bales by the tying medium and as a result encourages the use of bale hooks, which method of handling has proved safer and more efficient than handling by grasping the wire or twine.

Another distinct advantage of bales formed according to the invention is that the bales when stored may be naturally ventilated because air currents are permitted to pass through the grooves.

It is an important features of the invention to provide for the modification of a conventional baler by the installation therein of the groove-forming means. To this end, the invention is not limited to an automatic or pick-up type baler of the character described above, nor is the invention limited to a baler in which rectangular bales are formed.

A further important feature of the invention resides in the provision of an arrangement in which the tying medium may be more tightly bound about the bales. This arrangement involves the cooperation between the tying mechanism and the groove-forming channels, a portion of each channel opening exteriorly of the bale case and thus providing a recess or pocket for accommodating a twine-medium-handling element of the tying mechanism, whereby the tie or knot in the tying medium is formed substantially closer to the corner of the bale than has heretofore been possible.

The foregoing and other important objects and desirable features inherent in and encompassed by the invention will become apparent from the following detailed description and accompanying sheets of drawings in which Figures 1 and 2 are respectively top plan and rear elevational views showing generally a typical baler construction;

Figure 3 is an enlarged transverse sectional view taken on the line 3—3 of Figure 1, showing that form of the invention in which each of a pair of opposed bale case walls is provided with a pair of groove-forming elements;

Figure 4 is a fragmentary longitudinal sectional view taken substantially on the line 4—4 of Figure 3, but showing the tying needle in its tying rather than retracted position;

Figure 5 is a perspective view of the baler plunger;

Figure 6 is a fragmentary perspective view illustrating a section of the bale case in the zone of reciprocation of the plunger and showing the closed ends of the groove-forming channels;

Figure 7 is a perspective view illustrating the type of bale formed by the structure of Figures 1–6;

Figure 8 is a schematic view illustrating the stacking or piling of the bales in storage;

Figure 9 is a transverse sectional view through a modified form of bale case in which a single groove-forming means is provided at each of a pair of opposed walls;

Figure 10 is a perspective view of a bale formed in a bale case constructed as in Figure 9;

Figure 11 is a cross-sectional view of a bale case constructed according to a still further modification of the invention; and Figure 12 is a perspective view of a bale formed in the bale case of Figure 11.

GENERAL BALER CONSTRUCTION

Figures 1 and 2 are illustrative of a typical automatic pick-up baler of one well-known type. Such baler comprises essentially a main frame 10 carried by wheels 12 for advance over a field from which crop material such as hay, straw or the like may be gathered by pick-up means 14. In the particular baler shown, the main frame is provided with an elongated bale case 16 of rectangular section, to the interior of which the picked up crop material is fed by feeding means 18. Bales are successively formed within the bale case by the action of a reciprocating plunger 20 (Figures 4 and 5), and the bales are successively tied by tying mechanism including a tying housing 22 and tying-medium-feeding means in the form of a pair of needles 24. After each bale is formed in the bale case 16, it is moved to the left and outwardly onto a bale case extension 26, whence it drops rearwardly to the ground to be subsequently picked up by a bale loader or by manual labor.

The baler is customarily towed by a tractor or other source of propelling power and may be driven from the power take-off shaft of the propelling source or may be driven by a separate motor carried by the baler. In the instance illustrated, a draft tongue 28 is connected to the baler main frame 10 and carries a propeller shaft 30 by means of which power may be taken from the propelling source (not shown) and transmitted ultimately to the plunger 20 by means of a crankshaft and pitman designated together generally by the numeral 32. The tying mechanism is actuated at predetermined intervals by driving means designated generally by the numeral 34.

The foregoing description is brief and general merely for the purposes of orientation. Several details are omitted, because considered unimportant. Such details may be supplied by reference to U. S. Patent 2,484,890 to G. B. Hill, which issued October 18, 1945, and which may be considered generally typical of a pick-up baler utilizing twine as the medium for tying or binding the bales. In the present instance, the baler illustrated utilizes wire as the tying medium, and a pair of upper wire boxes 36 and a pair of lower wire boxes 38 are illustrated as representative examples of means for the feeding of wire to the tying mechanism housing 22. A representative disclosure of such wire boxes may be found in U. S. Patent 2,477,059 to G. B. Hill which issued July 26, 1949. The general baler structure, and particularly the feeding means, may be found in U. S. Patent 2,499,615 to M. H. Tuft which issued March 7, 1950. However, as already stated, these details are relatively unimportant except for background clarification of the baler as a whole.

Such details as are important with respect to the application of the present invention will be brought out below.

*Bale case structure and bale formation—Figures 1–8*

The bale case 16, as shown in Figure 3, is typically constructed of front and rear walls 40 and 42 and top and bottom walls 44 and 46 so that the bale case has a rectangular section. In the baler illustrated, the feeding means 18 feeds the crop material to the interior of the bale case 16 by means of a feed opening 48 (Figure 4) into the path of the reciprocating plunger 20. The plunger shown in Figure 4 is at the end of its compression stroke. That is, it has moved past the feed opening 48 and has picked up a charge of material and has moved this material to the left as the last charge (in the present illustration) in the formation of a bale B. A previously formed bale PB acts as a header for the bale B.

Also, as illustrated in Figure 4, the needles 24 have moved upwardly from their position of Figure 1 and across the bale case for cooperation with the tying mechanism housing 22, the details of which will be hereinafter explained. The point to be made here is that the leading face of the plunger is at 50 which, as will be observed, is considerably past or to the left of the needles 24. However, an examination of Figure 5 will reveal that the plunger is rearwardly slotted at 52 to accommodate the needles.

The zone of reciprocation of the plunger may be said to be within a plunger chamber PC that is longitudinally alined and contiguous with a bale chamber BC (Figure 4). Although there is no exact division between these two chambers, the assumed division has some importance with respect to the location and extent of the groove-forming means to be presently described.

In the embodiment of the invention disclosed in Figures 1–8, the groove-forming means comprises an upper pair of groove-forming elements 54 and a lower pair of similar elements 56.

Since, for all practical purposes, each of the elements 54—56 is identical, a description of one will suffice for all. Therefore, only the lower elements will be described; although, important differences between the upper and lower elements will be pointed out where necessary.

Each of the elements 56 is in the form of an elongated, relatively narrow channel opening to the interior of the bale case. This channel is provided by a pair of elongated narrow strips 58 rigidly fixed as by welding to and extending lengthwise of the bottom bale case wall 46. These strips when viewed as in Figure 3 converge inwardly but terminate short of a junction so that the inner or upper longitudinal edges thereof are parallel and spaced apart, thus giving the channel the characteristic of opening inwardly to the bale chamber BC. In length, the strips are preferably somewhat longer than BC and extend partly into the plunger chamber PC (Figure 4). It will be seen that as the plunger 20 moves from the plunger chamber to the junction of that chamber with the bale chamber BC, the leading face 50 of the plunger will ride past the right-hand end portions of the elements 56. For this purpose, the upper and lower portions of the plunger 20 that ride respectively on the upper and lower bale case walls 44 and 46 are respectively slotted or otherwise provided at 60 and 62 (Figure 5) to accommodate or receive the elements 56. To the extent indicated, the plunger may be said to be guided on the portions of the elements 56 that are common to the chambers BC and PC.

As best shown in Figures 4 and 6, the ends of the channels provided by the strips 58 are closed by closure means 64, each in the form of a ramp or plate inclined upwardly and inwardly in the direction away from the plunger. These plates or ramps prevent crop material from being forced between the strips 58 of each element 56 as the plunger moves or compresses the material to the left (as viewed in Figure 4).

Since the strips 58 are quite long, they may be suitably braced at intervals spaced longitudinally thereof by short cross braces or strips 66 (Figures 3 and 4).

As stated above, the upper elements 54 are similarly constructed and have identical parts. For the purposes of clarity, reference numerals on the upper elements, apart from the general designation by the numeral 54, have been omitted.

Each of the upper wire boxes 36 contains a coil or equivalent supply of tying medium which may be either twine or wire. In the present case, the tying medium is wire, and it will be hereinafter described as such; although, it will be obvious that twine could be used as well. The wire fed from each box 36 is designated at W in Figure 1 and Figure 4. A guide comprising a pair of rollers 67, located adjacent the tying mechanism housing 22, is utilized to feed the wire downwardly and through the tying mechanism housing 22 to the interior of the bale chamber BC. Since the groove-forming elements 54 are in the form of channels, they respectively receive the wires, which lie lengthwise along the groove-forming elements as at $W^1$ in Figures 3 and 4. One particular advantage of this arrangement is that the wires are confined respectively by the groove-forming elements 54, the strips comprising these elements forming means for retaining the wire $W^1$ against lateral displacement. At the same time, the channels confine the wire against entanglement with the crop material being compressed by the plunger 20.

The upper bale case wall 44 is provided with a pair of openings 68 respectively in alinement with and near the right-hand ends of the groove-forming elements 54. These openings provide access to the channels for the wire W as it passes through the tying mechanism housing 22 and extends into the portion $W^1$.

Each of the lower wire boxes 38 contains a coil or equivalent supply of wire which leads outwardly at $W^2$ (Figures 2 and 4) and around appropriate guide rollers 70 at the upper end of each needle 24. A typical arrangement is shown in U. S. Patent 2,458,318.

After the wire $W^2$ passes around the rollers 70 of the needle, it lies along the bottom of the bale case at $W^3$, being confined or retained in the respective lower groove-forming element 56, and thence extends upwardly at $W^4$ to form a loop by junction with $W^1$ in a tie or knot K. A similar knot will be formed by the tying mechanism between each bale. Hence, the illustration in Figure 4 is applicable; that is to say, the previously formed bale PB has been bound by a wire band or loop $W^5$ having a knot $K^1$ of which the knot K forms a severed portion as will be hereinafter explained. For all practical purposes, the wire portions $W^1$ and $W^4$ may be considered continuous and integral.

The tying mechanism contained in the tying mechanism housing 22 may be considered typical of wire-tying means. This mechanism includes a driving gear 72 keyed to a shaft 74 that is driven at appropriate intervals from the driving mechanism 34. A pair of twister gears 76 is in constant mesh with the driving gear 72. As seen in Figure 2, the twister gears are respectively alined vertically with the upper groove-forming channels 54. It will be seen further that the openings 68 respectively associated with the channels 54 are sufficiently large and so arranged as to accommodate portions of the twister gears, whereby these gears may be brought closer to the upper right-hand corner of the bale (see Figure 4). Each twister gear has a slot 78 therein into which the right-hand portions of the wire parts $W^1$ and $W^2$ are brought by the needles 24 as the needles move upwardly. The side-by-side portions of the wire between the needle rollers 70 extend as a bridge with the twister gears respectively between the rollers 70. Rotation of the shaft 74 is followed by rotation of the driving gear 72 and twister gears 76, whereupon the wire portion between the rollers 70 will be twisted to form a knot such as that at K. Appropriate severing means, not shown in detail, may be utilized to sever the twisted portions so that one part of the tie or knot completes the junction between the wire portions $W^1$ and $W^3$ at the upper right-hand corner of the bale and so that the other portion forms a tie or knot for a loop of wire to be wrapped around a succeeding bale.

The operation of, and the characteristics of the bales formed by, the structure just described is briefly as follows: Material is fed by the feeder 18 through the feed opening 48 into the plunger chamber PC and into the path of the reciprocating plunger 20. This material is compacted or moved to the left by the plunger into the baling chamber BC. Successive charges of this material form the elongated bale B. The upper and lower groove-forming channels 54 and 56 form in the bale B a pair of upper grooves G and a pair of lower grooves GL (Figure 7). As will be seen in this figure, the upper and lower wire portions $W^1$ and $W^2$ are respectively received by and retained in the upper and lower grooves G and GL. Although no grooves are provided across the ends of the bale, the absence of such grooves is relatively unimportant, since the grooves G and GL appropriately retain the wires against slipping off the corners of the bale.

As shown in Figure 8, the grooves are sufficiently pronounced so that when the bales are piled or stacked, ventilating passages—suggested at V—occur between the bales.

Modification—Figures 9 and 10

In Figure 9, a bale case is designated generally by the numeral 16a and has front and rear walls 40a and 42a and top and bottom walls 44a and 46a. In this case, the upper wall 44a is provided with a single groove-forming element 54a; and the lower wall 46a is provided with a corresponding or complementary groove-forming element 56a. These elements are located centrally of their respective walls and in structure and function correspond exactly to the elements 54 and 56 previously described. Hence, further detailed description thereof is deemed unnecessary.

Figure 10 shows the form of bale made by a bale case such as that at 16a, the bale being designated generally by the character $B^a$. It is deemed unnecessary to elaborate upon the groove formation and the wire-retaining characteristics thereof.

Modification—Figures 11 and 12

The bale case in Figure 11 is designated by the numeral 16b. This bale case forms a bale $B^b$ as shown in Figure 12. This bale has some of the characteristics of the bales B and $B^a$; that is, it has a single groove, as does the bale $B^a$, but the groove accommodates a pair of wires conventionally spaced, as does the bale B.

For the purpose of providing the bale $B^b$, the bale case 16b has an upper groove-forming means 54b and a lower groove-forming means 56b. The upper means is provided by a pair of elongated strips 58b spaced relatively widely apart as compared to the spacing of the strips 58 in Figure 3. The spacing is sufficiently wide to accommodate the two upper wires of the bale, here designated again by the character $W^1$. However, in order to confine the two wires $W^1$ to their proper spacing, the groove-forming means 54b includes partitioning means designated generally by the numeral 80 and comprising an elongated member in the form of a channel inverted with respect to the channels into which the groove-forming means 54b is subdivided. In effect, the result in so far as concerns confining or retaining of the wires $W^1$ follows closely the results obtained in the structure of Figure 3.

The lower groove-forming means 56b is identical to that just described and the channels provided therefor accommodate or receive the lower wires $W^3$. In view of the similarity, further detailed discussion is deemed unnecessary.

SUMMARY

In all forms of the invention, the primary concern is with the formation of grooves in the bale so that the bale has the characteristics previously referred to; viz., wire-retention and ventilation. In each case, the groove or grooves are formed by longitudinal or elongated groove-forming channels. As specifically described in connection with the description of Figures 1–7, the channels cooperate in a particular manner with elements of the tying mechanism so that a tighter wire can be obtained by virtue of the closer location of the tying element to the corner of the bale at which the tie or knot is effected. These characteristics follow also with respect to the modified forms of bale cases shown in Figures 9 and 11. Any form of the invention may be readily adapted to most conventional balers without departure from the specific disclosure. On the other hand, the specific disclosure is illustrative and is intended not to limit the application of the invention but to suggest appropriate operations of the preferred embodiment illustrated for use in balers of types different from that disclosed herein, all of which changes and alterations may be made without departing from the spirit and scope of the invention as defined in the appended claims.

What is claimed is:

1. In a crop baler: means including a plurality of wall portions arranged to provide an elongated bale chamber; means fixed to the interior of one of said wall portions and running lengthwise thereof to form an elongated channel projecting into and opening to the interior of the bale case for forming a lengthwise groove in a bale being formed and adapted to accommodate lengthwise thereof a strand of a tying medium such as twine or wire; said one wall portion having an opening alined with said channel and through which such strand of tying medium may extend between the channel and the exterior of the bale case; and tying mechanism carried at the exterior of the bale case for handling the tying medium, said mechanism including a tying-medium-handling element receivable through said opening and accommodated by and within the channel so as to operate relatively close to the bottom of the groove formed in a bale by said groove-forming channel.

2. The invention defined in claim 1, further characterized in that: said opening in length is substantially coextensive with said channel; and a plurality of cross-members are spaced apart lengthwise of the channel and cross-connect opposite sides of the channel.

HERMAN E. ALTGELT.

REFERENCES CITED

The following references are of record in the file of this patent:

UNITED STATES PATENTS

| Number | Name | Date |
|---|---|---|
| 214,282 | Dederick | Apr. 15, 1879 |
| 1,260,605 | Vinton | Mar. 26, 1918 |